(12) United States Patent
Takatsugi et al.

(10) Patent No.: US 10,430,965 B2
(45) Date of Patent: Oct. 1, 2019

(54) DISPLAY SYSTEM AND DISPLAY METHOD

(71) Applicant: FANUC CORPORATION, Yamanashi (JP)

(72) Inventors: Satoshi Takatsugi, Yamanashi-ken (JP); Tatsuhiro Uchiyama, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/909,039

(22) Filed: Mar. 1, 2018

(65) Prior Publication Data

US 2018/0253860 A1    Sep. 6, 2018

(30) Foreign Application Priority Data

Mar. 2, 2017    (JP) ................................. 2017-038929

(51) Int. Cl.

| | |
|---|---|
| *B29C 33/30* | (2006.01) |
| *G06T 7/70* | (2017.01) |
| *G06K 9/00* | (2006.01) |
| *B29C 45/17* | (2006.01) |
| *B29C 45/84* | (2006.01) |
| *H04N 7/18* | (2006.01) |
| *B29C 45/76* | (2006.01) |

(52) U.S. Cl.
CPC .............. *G06T 7/70* (2017.01); *B29C 33/303* (2013.01); *B29C 33/305* (2013.01); *B29C 33/307* (2013.01); *B29C 45/1742* (2013.01); *B29C 45/84* (2013.01); *G06K 9/00624* (2013.01); *B29C 2045/7606* (2013.01); *B29C 2945/76083* (2013.01); *B29C 2945/76224* (2013.01); *B29C 2945/76461* (2013.01); *H04N 7/183* (2013.01)

(58) Field of Classification Search
CPC ... B29C 45/1742; B29C 33/305; B29C 33/30; B29C 33/303; G06T 7/70; G06T 7/77
See application file for complete search history.

(56) References Cited

U.S. PATENT DOCUMENTS

| | | | | |
|---|---|---|---|---|
| 4,236,181 A | * | 11/1980 | Shibata | ............... B29C 45/7626 |
| | | | | 250/559.39 |
| 4,841,364 A | * | 6/1989 | Kosaka | ............... B29C 45/7626 |
| | | | | 348/128 |
| 5,247,585 A | * | 9/1993 | Watanabe | .................. G06T 7/73 |
| | | | | 348/126 |

(Continued)

FOREIGN PATENT DOCUMENTS

| | | |
|---|---|---|
| CN | 101837627 A | 9/2010 |
| CN | 104802382 A | 7/2015 |

(Continued)

OTHER PUBLICATIONS

English Abstract and Machine Translation for Japanese Publication No. 2002-028929 A, published Jan. 29, 2002, 7 pgs.

(Continued)

*Primary Examiner* — Robert J Hance
(74) *Attorney, Agent, or Firm* — Fredrikson & Byron, P.A.

(57) ABSTRACT

A display system includes: an imaging unit that images a mold from below; and a display unit that displays an image taken by the imaging unit together with a carry-in range of the mold in order to transport the mold in place between the stationary platen and the moving platen.

14 Claims, 10 Drawing Sheets

(56) References Cited

U.S. PATENT DOCUMENTS

| | | | | |
|---|---|---|---|---|
| 5,928,578 | A | * 7/1999 | Kachnic | B29C 45/7626 264/334 |
| 6,068,464 | A | * 5/2000 | Su | B29C 31/006 249/117 |
| 6,699,425 | B1 | * 3/2004 | Reuther | B29C 59/02 264/293 |
| 2003/0194460 | A1 | * 10/2003 | Watanabe | B29C 45/76 425/137 |
| 2005/0240303 | A1 | * 10/2005 | Smith | B29C 45/80 700/200 |
| 2008/0152918 | A1 | 6/2008 | Pado et al. | |
| 2009/0214761 | A1 | 8/2009 | Sreenivasan et al. | |
| 2010/0072653 | A1 | * 3/2010 | Kawakami | B29C 43/003 264/134 |
| 2013/0285285 | A1 | * 10/2013 | Shimoda | B82Y 10/00 264/293 |
| 2015/0021797 | A1 | * 1/2015 | Takemura | B29C 43/04 264/1.7 |
| 2016/0263799 | A1 | * 9/2016 | Shiraishi | B29C 45/1753 |
| 2017/0015041 | A1 | * 1/2017 | Shiraishi | B29C 45/80 |
| 2017/0291347 | A1 | * 10/2017 | Geltinger | B29C 33/28 |

FOREIGN PATENT DOCUMENTS

| | | | | |
|---|---|---|---|---|
| CN | 106346730 | A | | 1/2017 |
| DE | 10129189 | A1 | | 1/2003 |
| DE | 102015117292 | A1 | | 4/2017 |
| JP | 62108020 | | * | 5/1987 |
| JP | 004115924 | | * | 4/1992 ............. B29C 33/30 |
| JP | 04115924 | | * | 4/1992 |
| JP | 04138235 | A | * | 5/1992 ............. B29C 33/70 |
| JP | 1148301 | A | | 2/1999 |
| JP | 200228929 | A | | 1/2002 |
| JP | 2007015814 | A | | 1/2007 |
| JP | 2007015814 | A | * | 1/2007 |
| JP | 2011079648 | A | | 4/2011 |
| JP | 2013095040 | A | | 5/2013 |

OTHER PUBLICATIONS

English Abstract and Machine Translation for Japanese Publication No. 11-048301 A, published Feb. 23, 1999, 6 pgs.

English Abstract and Machine Translation for Japanese Publication No. 2007015814 A, published Jan. 25, 2007, 38 pages.

English Abstract and Machine Translation for Japanese Publication No. 2011079648 A, published Apr. 21, 2011, 13 pages.

English Abstract and Machine Translation for Japanese Publication No. 2013095040 A, published May 20, 2013, 12 pages.

English Machine Translation of Decision to Grant issued by Japan Patent Office (JPO) in Japanese Application No. 2017-038929, dated Nov. 13, 2018, 3 pages.

Untranslated Decision to Grant issued by Japan Patent Office (JPO) in Japanese Application No. 2017-038929, dated Nov. 13, 2018, 3 pages.

English Machine Translation of Notification of Reasons for Refusal issued by Japan Patent Office (JPO) in Japanese Application No. 2017-038929, dated Oct. 2, 2018, 2 pages.

Untranslated Notification of Reasons for Refusal issued by Japan Patent Office (JPO) in Japanese Application No. 2017-038929, dated Oct. 2, 2018, 2 pages.

English Abstract and Machine Translation for German Publication No. 10129189 A1, published Jan. 2, 2003, 12 pgs.

English Abstract and Machine Translation for German Publication No. 102015117292 A1, published Apr. 13, 2017, 46 pgs.

English Abstract and Machine Translation for Chinese Publication No. 101837627 A, published Sep. 22, 2010, 47 pgs.

English Abstract and Machine Translation for Chinese Publication No. 104802382 A, published Jul. 29, 2015, 20 pgs.

English Abstract and Machine Translation for Chinese Publication No. 106346730 A, published Jan. 25, 2017, 10 pgs.

* cited by examiner

DISPLAY SYSTEM AND DISPLAY METHOD

CROSS-REFERENCE TO RELATED APPLICATION

This application is based upon and claims the benefit of priority from Japanese Patent Application No. 2017-038929 filed on Mar. 2, 2017, the contents of which are incorporated herein by reference.

BACKGROUND OF THE INVENTION

Field of the Invention

The present invention relates to a display system and a display method of imaging and displaying a mold.

Description of the Related Art

Japanese Laid-Open Patent Publication No. 2002-028929 discloses a method of attaching a mold to an injection molding machine by bringing the mold between the stationary platen and the moving platen of the clamping device by means of a crane.

SUMMARY OF THE INVENTION

When a mold is transported from above by a crane into a space between the stationary platen and the moving platen in the clamping device of the injection molding machine, if the mold interferes with an obstacle (stationary platen, moving platen, tie bars, etc.), the mold and/or the obstacle will be damaged. To avoid this, the operator must operate the crane so that the mold will not interfere with any obstacle. The place where the operator controls the crane is around the injection molding machine. Particularly, in a case of a large injection molding machine, since there is a long distance from the operator to the place where the mold is carried into the injection molding machine, it is difficult to properly grasp the course through which the mold should be carried in. Therefore, in order to bring in the mold while avoiding interference with obstacles, skilled crane operation techniques are required and still a careful operation of the crane has taken time.

In view of the above, it is therefore an object of the present invention to provide a display system and a display method for assisting the carrying-in operation of a mold by displaying the state of a mold being conveyed between a stationary platen and a moving platen in a clamping device of an injection molding machine.

According to a first aspect of the present invention, a display system for displaying the state of a mold being transported from above into a space between a stationary platen and a moving platen that moves in a predetermined direction relative to the stationary platen in a clamping device includes: an imaging unit configured to image the mold from below; and a display unit configured to display an image taken by the imaging unit together with a carry-in range of the mold in order to transport the mold in place between the stationary platen and the moving platen.

According to a second aspect of the present invention, a display method of displaying the state of a mold being transported from above into a space between a stationary platen and a moving platen that moves in a predetermined direction relative to the stationary platen in a clamping device includes: an imaging step of imaging the mold from below by an imaging unit; and a displaying step of displaying on a display unit the taken image together with a carry-in range of the mold in order to transport the mold in place between the stationary platen and the moving platen.

According to the present invention, it is possible to show the carry-in route of the mold to the operator who operates the crane. Therefore, the operator can put the mold in place between the stationary platen and the moving platen of the clamping device without causing the mold to interfere with the obstacles, and hence shorten the time for loading the mold.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2A is a diagram when the clamping device is viewed from the front and FIG. 2B is a sectional diagram cut along a plane IIB-IIB in FIG. 2A;

FIG. 7A is a diagram when the clamping device is viewed from the front and FIG. 7B is a sectional diagram cut along a plane VIIB-VIIB in FIG. 7A;

DESCRIPTION OF THE PREFERRED EMBODIMENTS

A display system and a display method according to the present invention will be detailed hereinbelow by describing preferred embodiments with reference to the accompanying drawings.

EMBODIMENT

Figure 1:
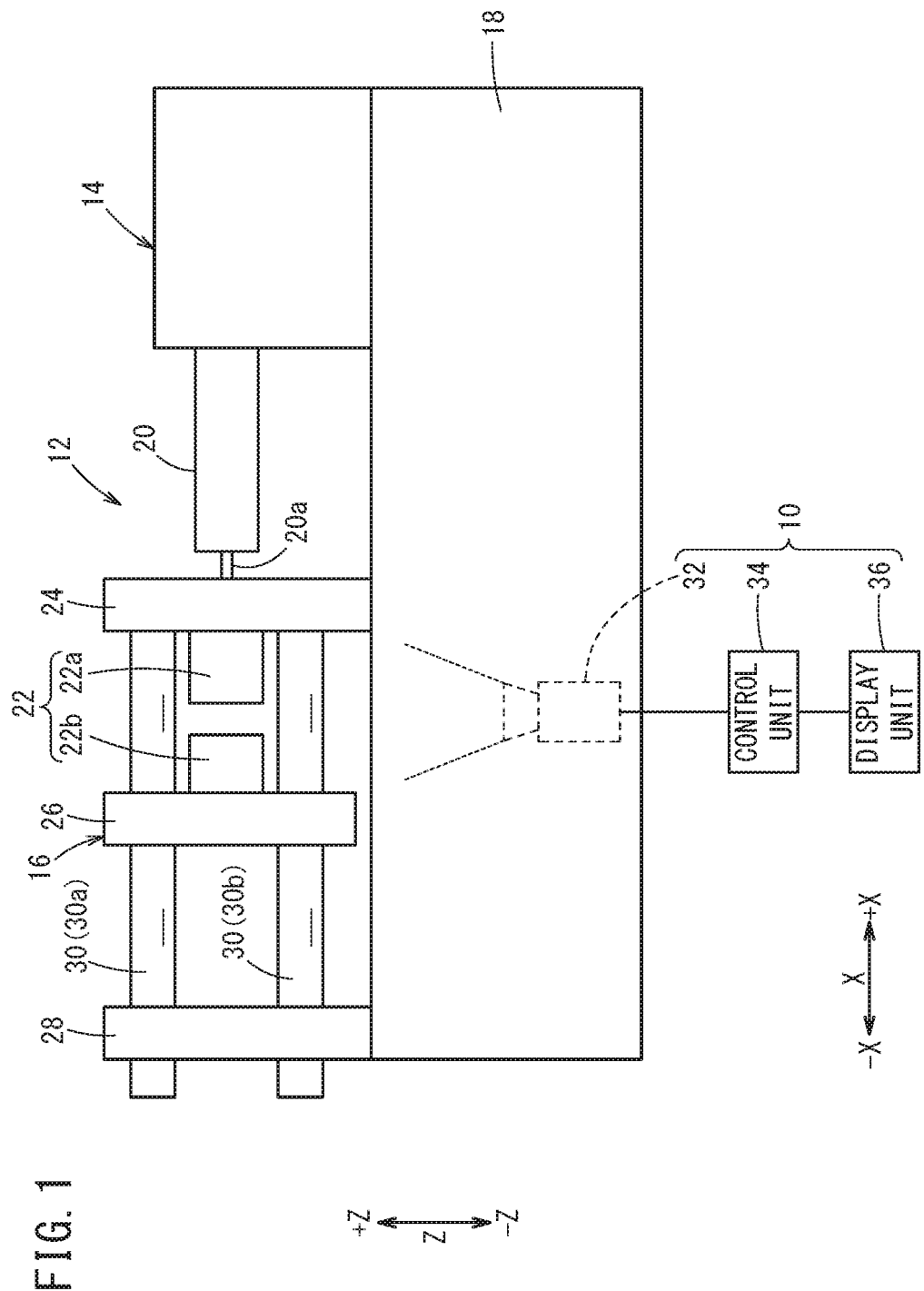
FIG. 1 is a diagram showing a configuration of a display system and an injection molding machine equipped with the display system.

FIG. 1 is a view showing a configuration of a display system 10 and an injection molding machine 12 equipped with the display system 10. The injection molding machine 12 includes an injector 14, a clamping device 16, and a machine base 18 that supports the injector 14 and the clamping device 16. In the following description, an orthogonal XYZ coordinate system is set up where the X-direction (±X-direction), the Y-direction (±Y-direction), and the Z-direction (±Z-direction) are defined by the arrows shown in the drawings. It is assumed that the direction of gravity is the negative Z-direction (downward direction), and the injection molding machine 12 is set on the installation surface parallel to the XY-plane. The negative X-direction is the left direction in FIG. 1. The Y-direction is orthogonal to the paper surface of FIG. 1, and the negative Y-direction is the front side of the paper surface of FIG. 1.

The injector 14 has an injection cylinder 20, and injects molten resin of the injection cylinder 20 through a nozzle 20a of the injection cylinder 20 into a mold 22 (specifically, a cavity) of the clamping device 16. The injector 14 and the clamping device 16 are installed on the machine base 18 so as to face each other along the X-direction in which the mold 22 is opened and closed. The axial direction of the injection cylinder 20 is parallel to the X-direction. The injector 14 injects molten resin into the mold 22 along the negative X-direction.

An unillustrated injection screw is arranged inside the injection cylinder 20. This injection screw is moved in the positive X-direction rotating to charge and measure the molten resin. Then, the injection screw is moved in the negative X-direction toward the mold 22, whereby the molten resin in the injection cylinder 20 is injected into the mold 22 through the nozzle 20a. The injection cylinder 20 may be heated by, for example, a heater or the like to melt pellet resin supplied from an unillustrated hopper. The rotation of the injection screw and the movement thereof in the X-direction are actuated by an unillustrated drive source such as a servomotor.

The clamping device 16 holds the mold 22 and performs an opening and closing operation for opening and closing the mold 22 and a clamping operation for generating clamping force by means of an unillustrated toggle mechanism and an unillustrated driving mechanism including a servomotor. The mold 22 includes a stationary half 22a attached to a stationary platen 24 and a moving half 22b attached to a moving platen 26. In a molding process, the clamping device 16 moves the moving half 22b in the closing direction (positive X-direction) to bring the moving half 22b into contact with the stationary half 22a, and further moves the moving half 22b in the closing direction (positive X-direction) to clamp the mold. Further, after the molding process, the clamping device 16 moves the moving half 22b in the opening direction (negative X-direction) to separate the moving half 22b from the stationary half 22a.

The clamping device 16 includes the stationary platen 24, the moving platen 26, a rear platen 28, and four tie bars 30 (30a to 30d). The four tie bars 30 are arranged parallel to the X-direction and connect the stationary platen 24 and the rear platen 28. The moving platen 26 is disposed between the stationary platen 24 and the rear platen 28 so as to be movable in the X-direction along the four tie bars 30. The stationary platen 24, the rear platen 28, and the moving platen 26 have substantially square shapes, and four tie bars 30 are provided at four corners, respectively. The rear platen 28 and the moving platen 26 are arranged so as to be slidable in the X-direction relative to the tie bars 30, and the stationary platen 24 is fixed to the tie bars 30 so as not to slide in the X-direction.

Figure 2A:
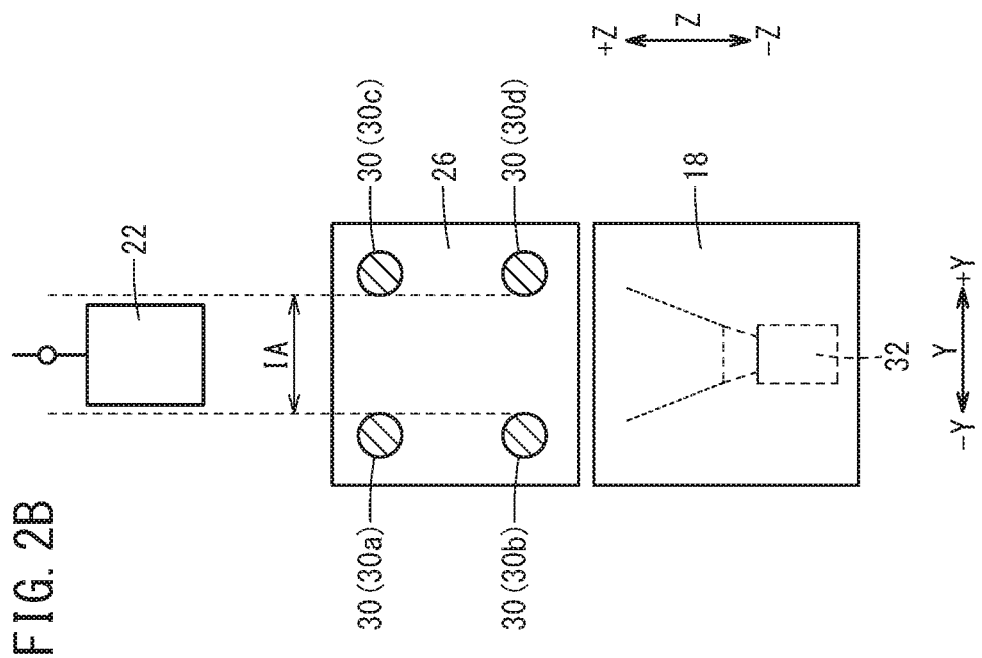
FIGS. 2A and 2B are views showing the loading of a mold between a stationary platen and a moving platen of a clamping device shown in FIG. 1 where
Figure 2B:
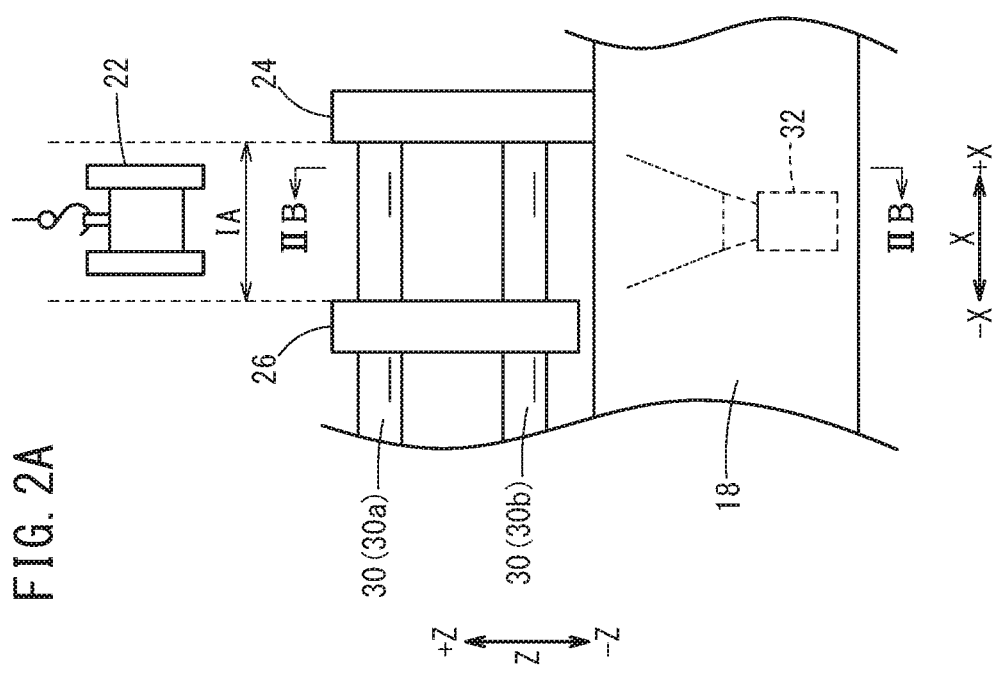

Here, as shown in FIGS. 2A and 2B, the mold 22 with the stationary half 22a and the moving half 22b integrated is transported from above (positive Z-direction) downward (in the negative Z-direction), toward between the stationary platen 24 and the moving platen 26, by an unillustrated crane. After the mold 22 is conveyed in place between the stationary platen 24 and the moving platen 26, the stationary half 22a is attached to the stationary platen 24 and the moving half 22b is attached to the moving platen 26.

Figure 3:
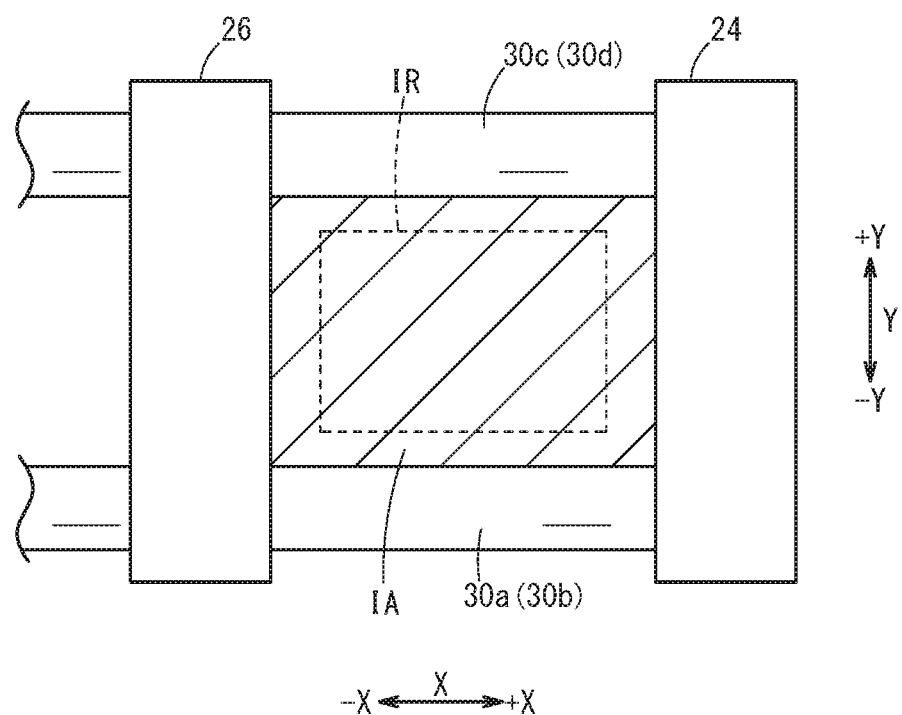
FIG. 3 is a diagram showing a mold-transportable area.

During this operation, in order to convey the mold 22 in place between the stationary platen 24 and the moving platen 26 without having the mold 22 interfere with obstacles such as the stationary platen 24, the moving platen 26, the tie bars 30, etc., it is necessary to lower the mold 22 by the crane so that the mold 22 is positioned within a mold-transportable area IA. Therefore, the mold-transportable area IA is specified as a region surrounded by the stationary platen 24, the moving platen 26, and two tie bars 30 (30a, 30c or 30b, 30d) provided along the Y-direction, as shown in FIG. 3. The length in the X-direction of the mold-transportable area IA is the distance between the surface on the negative X-direction side of the stationary platen 24 and the surface on the positive X-direction side of the moving platen 26 (see FIG. 2A). The length in the Y-direction (width direction) of the mold-transportable area IA is the distance between the two tie bars 30 (30a, 30c or 30b, 30d) provided along the Y-direction (see FIG. 2B).

It is assumed in the present embodiment that the positions of the two tie bars 30a and 30b that are on the negative Y-direction side and are arranged along the vertical direction (Z-direction) are coincident with each other in the Y-direction while the positions of the two tie bars 30c and 30d that are on the negative Y-direction side and are arranged along the vertical direction (Z-direction) are coincident with each other in the Y-direction. Further, it is also assumed that the positions of the two tie bars 30a and 30c that are on the positive Z-direction side and are arranged along the Y-direction are coincident with each other in the Z-direction while the positions the two tie bars 30b and 30d that are on the negative Z-direction side and are arranged along the Y-direction are coincident with each other in the Z-direction.

Returning to the explanation with FIG. 1, the display system 10 displays the transported state of the mold 22 being carried between the stationary platen 24 and the moving platen 26 from above. The display system 10 includes an imaging unit 32, a control unit 34, and a display unit 36. The imaging unit 32 is arranged in the machine base 18 of the injection molding machine 12 so as to be able to capture the transported state of the mold 22 from the lower side (the negative Z-direction side) which is the conveying direction side. The imaging unit 32 is located between and below the stationary platen 24 and the moving platen 26 (see FIG. 2A). Further, the imaging unit 32 is positioned between two tie bars 30 (30a, 30c or 30b, 30d) arranged along the Y-direction (see FIG. 2B).

The control unit 34 acquires image data (hereinafter, simply referred to as an image) captured by the imaging unit 32. The control unit 34 outputs the acquired image to the display unit 36 and outputs information indicating a carry-in range IR to the display unit 36. The control unit 34 has an unillustrated storage medium that stores information on carry-in range IR. The information on carry-in range IR stored in the storage medium is information indicating the carry-in ranges IR of different sizes corresponding to predetermined distances from the imaging unit 32. The predetermined distance from the imaging unit 32 is a distance from the imaging unit 32 to a certain point in the upward direction (positive Z-direction). Here, the control unit 34 may perform image processing on the acquired image and output the processed image to the display unit 36.

The carry-in range IR may be identical with the above-described mold-transportable area IA or may be smaller than the mold-transportable area IA. As shown in FIG. 3, by making the carry-in range IR smaller than the mold-transportable area IA, it is possible to further suppress the interference between the mold 22 and obstacles. The size of the carry-in range IR and the mold-transportable area IA indicates the size on the plane parallel to the XY-plane. Note that the imaging unit 32 also images the mold-transportable area IA surrounded by the stationary platen 24, the moving platen 26, and the four tie bars 30.

The display unit 36 is arranged at a position visible from the crane's operator. The display unit 36 displays the state of the mold 22 being transported in order to assist transportation of the mold 22 into the clamping device 16. The display unit 36 displays the image sent from the control unit 34 and the carry-in range IR based on the information on carry-in range IR. The displayed carry-in range IR is one having a size corresponding to a predetermined distance from the imaging unit 32. The display position of the carry-in range IR on the image is determined according to the installation position of the imaging unit 32 and the predetermined distance from the imaging unit 32. In this embodiment, for description simplicity, it is assumed that the carry-in range IR is smaller than the mold-transportable area IA.

Figure 4:
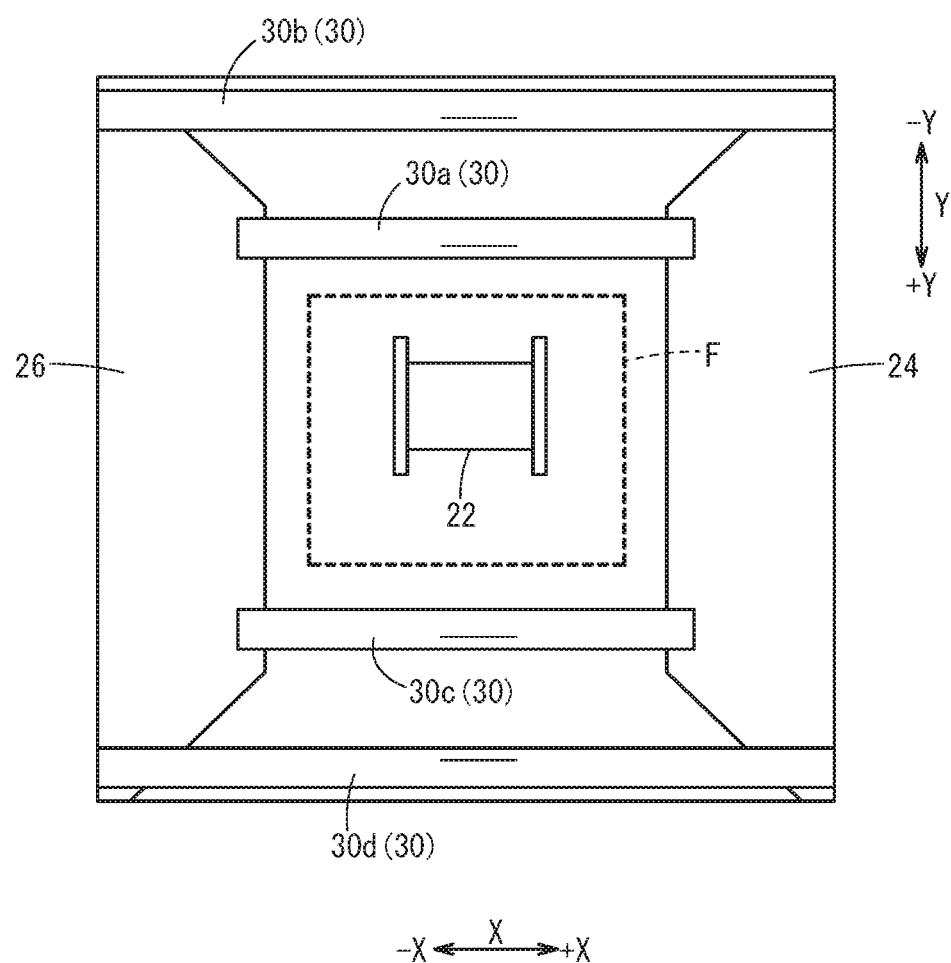
FIG. 4 is a diagram showing a display example of a display unit shown in FIG. 1.

FIG. 4 is a diagram showing a display example of the display unit 36. As shown in FIG. 4, on the display unit 36 the image captured by the imaging unit 32 is displayed with a frame F. This frame F shows the carry-in range IR, that is, the area surrounded by the frame F is the carry-in range IR. The displayed carry-in range IR shows a range having a size corresponding to the predetermined distance from the imaging unit 32. For example, the carry-in range IR to be displayed may be one at a position 1 m high from the upper surface of the stationary platen 24 and the moving platen 26. It is apparent that when the mold 22 is located in a short distance from the upper surface of the stationary platen 24 and the moving platen 26, the displayed area surrounded by the stationary platen 24, the moving platen 26, and the tie bars 30a, 30c substantially coincides with the carry-in range IR, the frame F may be hidden.

In this way, by displaying the carry-in range IR together with the image, it is possible to guide the mold 22 along the carry-in route. Therefore, the operator, as watching the image displayed on the display unit 36, operates the crane so that the mold 22 displayed on the display unit 36 falls within the carry-in range IR, whereby it is possible to lead the mold 22 in place between the stationary platen 24 and the moving platen 26 without causing the mold 22 to interfere with any obstacles. Further, the time for loading the mold 22 can be shortened.

When the position of the mold 22 is located lower than the position at the predetermined distance from the imaging unit 32, the mold 22 may be displayed greater than the carry-in range IR. In this case, the operator only needs to operate the crane so that the center of the mold 22 coincides with the center of carry-in range IR.

The displayed image of the mold 22 becomes smaller as the distance from the imaging unit 32 becomes longer, or becomes greater as the distance becomes shorter. Accordingly, the storage medium in the control unit 34 may store multiple pieces of information each representing a carry-in range IR of a size corresponding to a different predetermined distance from the imaging unit 32. Further, the control unit 34 may output to the display unit 36 the multiple pieces of information indicating the multiple carry-in ranges IR stored in the storage medium. In this case, the display unit 36 displays image captured by the imaging unit 32 together with the multiple carry-in ranges IR based on the aforementioned multiple pieces of information.

Figure 5:
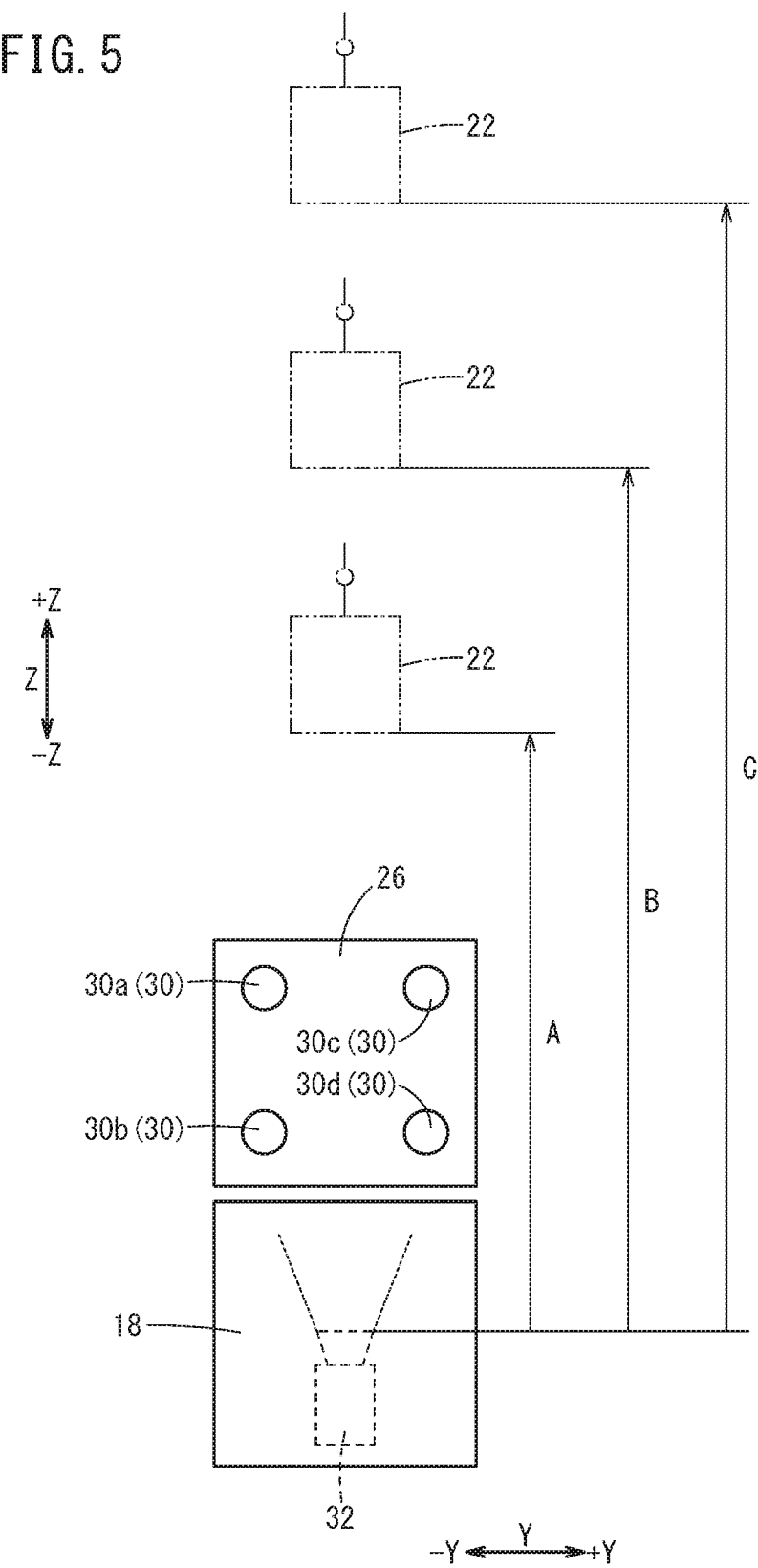
FIG. 5 is a diagram showing vertical distances determined in advance from an imaging unit shown in FIG. 1.
Figure 6:
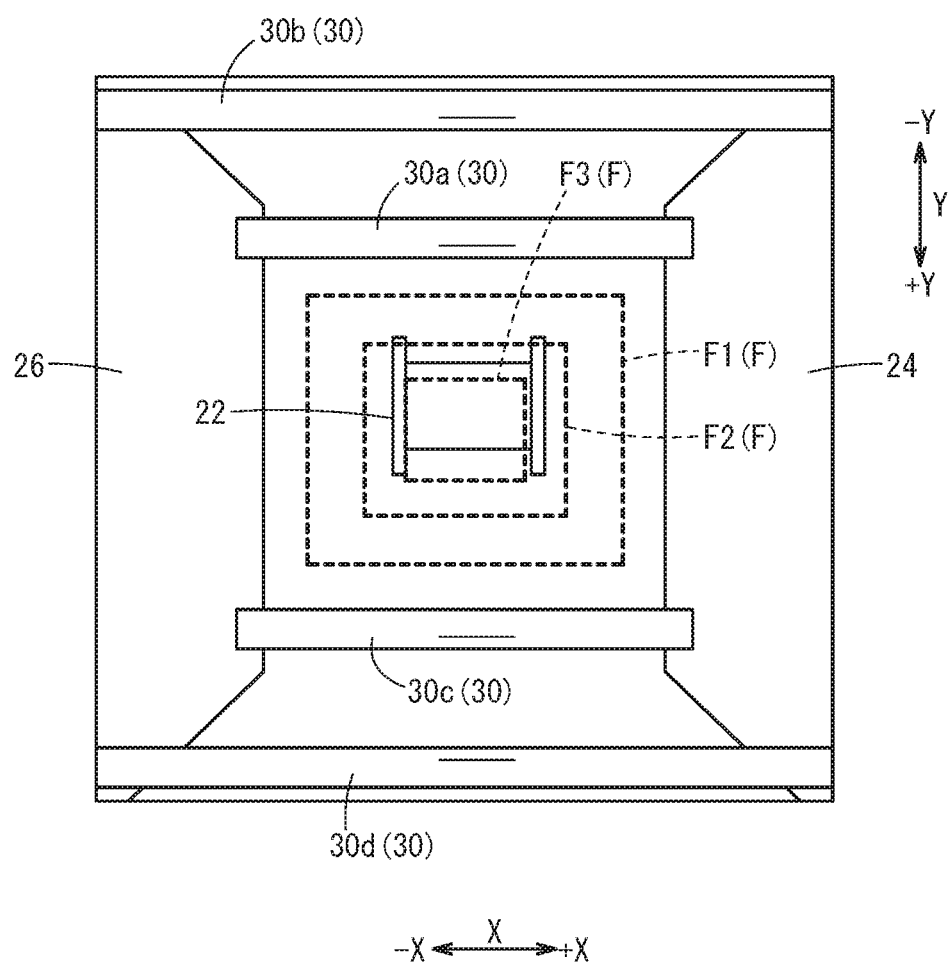
FIG. 6 is a diagram showing an example in which carry-in ranges corresponding to the distances shown in FIG. 5 are displayed together on the display unit shown in FIG. 1.

For example as shown in FIG. 5, suppose that multiple pieces of information on carry-in ranges IR (IR1 to IR3) of different sizes corresponding to respective distances A, B and C from the imaging unit 32 have been stored in the storage medium of the control unit 34. In this case, as shown in FIG. 6 the display unit 36 displays a frame F1 showing the carry-in range IR corresponding to the distance A, a frame F2 showing the carry-in range IR corresponding to the distance B, and a frame F3 showing the carry-in range IR corresponding to the distance C, altogether. Since the distance A<the distance B<the distance C, the sizes of the displayed frames F become as follows: F1>F2>F3. The display positions of the carry-in ranges IR1, IR2, IR3 on this image are determined depending on the installed position of the imaging unit 32 and the distances A, B, C.

In this case, first, the mold 22 is displayed on the display unit 36 to be smaller than the frame F3, and the mold 22 displayed gradually becomes greater as the mold 22 lowers. Thereafter, the mold 22 on the display becomes greater than the frame F3, and when the mold 22 lowers further, the mold 22 on the display becomes greater than the frame F2. Finally, the mold 22 on the display becomes greater than the frame F1.

As a result, when the operator controls the crane so as to fit the mold 22 within the smallest carry-in range IR among the displayed carry-in ranges IR greater than the mold 22, it is possible to lead the mold 22 into place between the stationary platen 24 and the moving platen 26 without causing any interference with obstacles. Further, displaying the multiple carry-in ranges IR having different sizes corresponding to a plurality of distances enables precise guidance of the mold 22 through the carry-in route and makes it possible to shorten the time for loading the mold 22.

VARIATIONAL EXAMPLES

The above-described embodiment can also be modified as follows.

Variational Example 1

In the above embodiment, the imaging unit 32 is provided on the machine base 18 so that the obstacles, i.e., the stationary platen 24, the moving platen 26, and the tie bars 30 can be imaged together with the mold 22. In variational example 1, however, the imaging unit 32 is arranged at a position where the imaging unit 32 cannot capture the stationary platen 24, the moving platen 26, and the tie bars 30. Here, also in variational example 1, as the above embodiment, the mold 22 is imaged from the side to which the mold is loaded (negative Z-direction side).

Figure 7A:
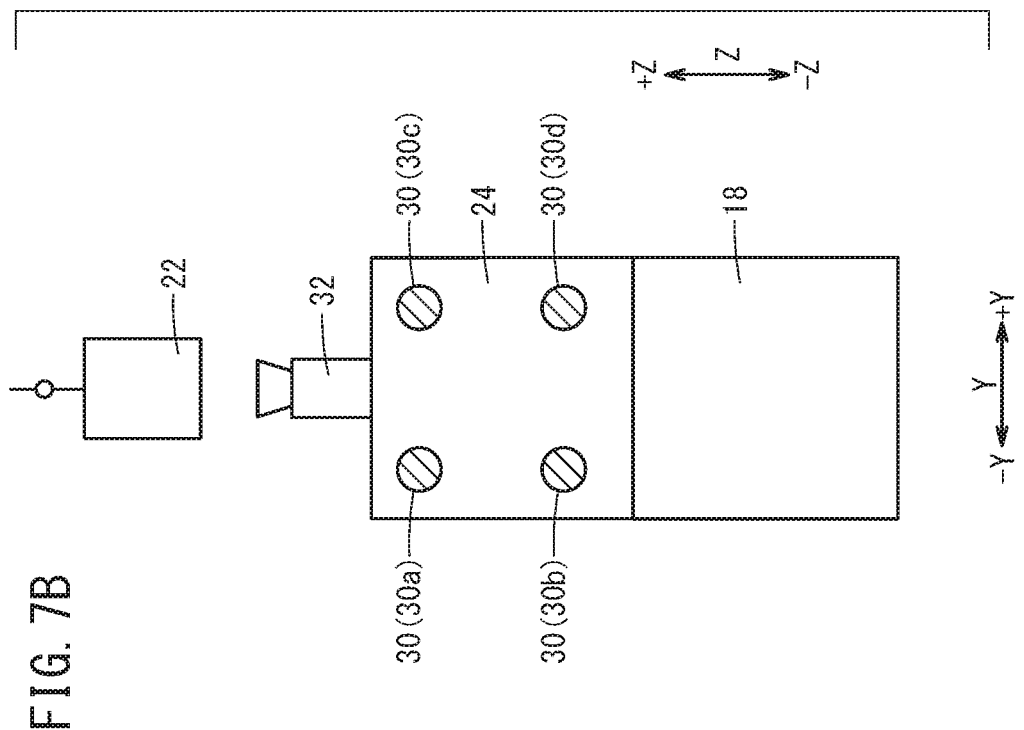
FIGS. 7A and 7B are views showing an example of the installation of the imaging unit according to variational example 1 where
Figure 7B:
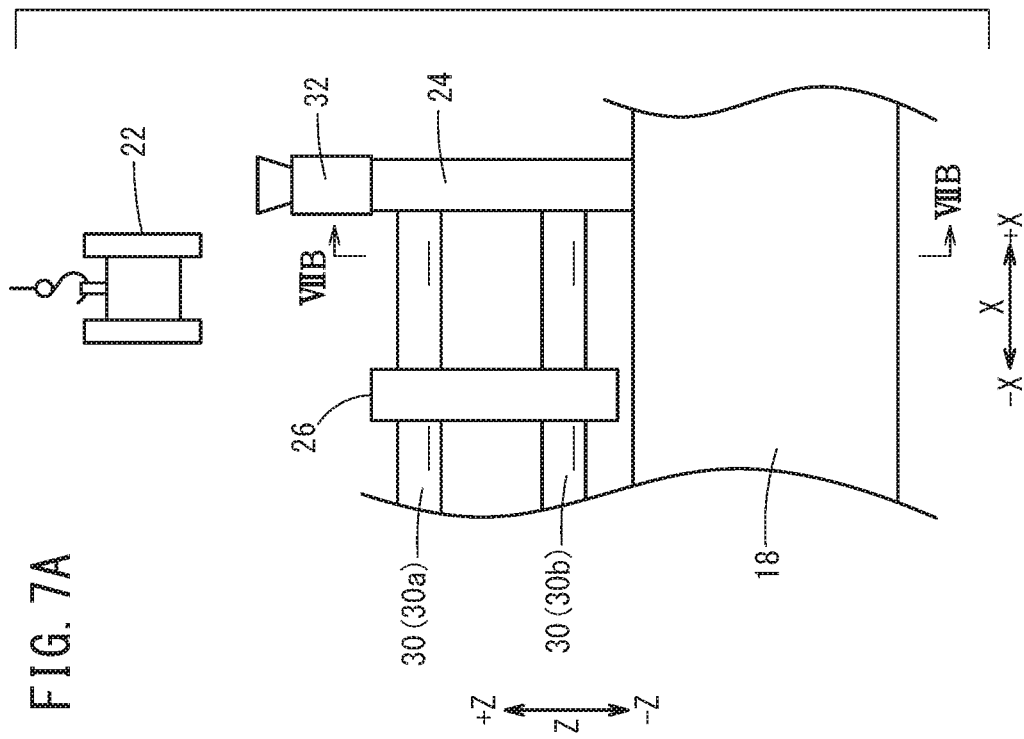

FIGS. 7A and 7B are views showing an installation example of the imaging unit 32 in variational example 1, FIG. 7A being a diagram when the clamping device is viewed from the front and FIG. 7B being a sectional diagram cut along a plane VIIB-VIIB in FIG. 7A. Here, the same components as those described in the above embodiment are allotted with the same reference numerals, and only the different points will be described.

The imaging unit 32 is arranged on the upper surface of the stationary platen 24. Thereby, the imaging unit 32 does not pick up the image of the stationary platen 24, the moving platen 26, and the tie bars 30, but can capture images of the mold 22 carried in by the crane. In this case, it is preferable that the imaging unit 32 is arranged between the two tie bars 30 (30a, 30c or 30b, 30d) provided along the Y-direction (see FIG. 7B).

Figure 8:
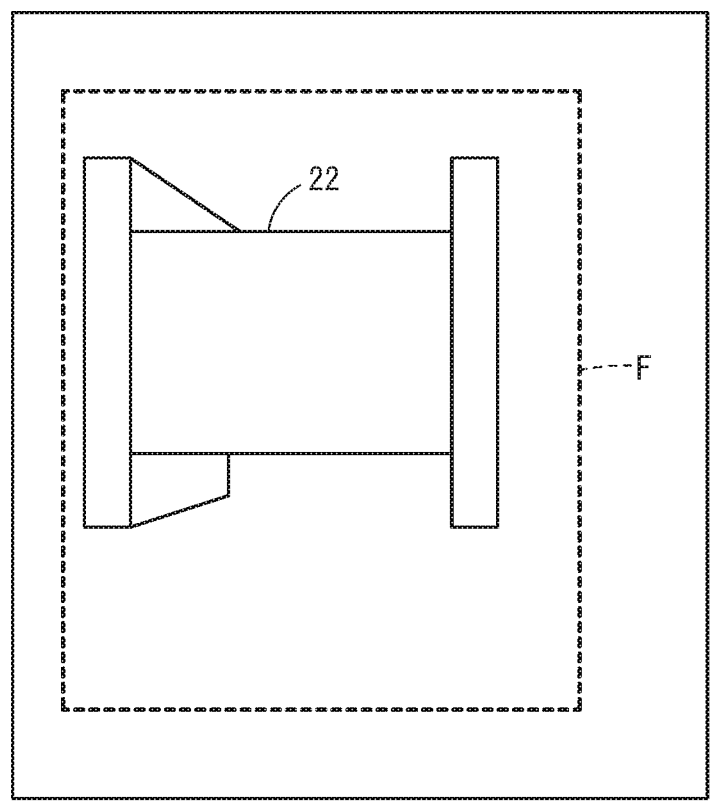
FIG. 8 is a diagram showing a display example of the display unit according to variational example 1.

FIG. 8 is a diagram showing a display example of the display unit of variational example 1. As shown in FIG. 8, on the display unit 36, the image captured by the imaging unit 32 is displayed with a frame F. This frame F shows the carry-in range IR. The area surrounded by the frame F is the carry-in range IR.

In this way, even if the obstacles, i.e., the stationary platen 24, the moving platen 26, and the tie bars 30 are not imaged, it is possible to guide the mold 22 through the carry-in route by displaying the image of the mold 22 together with the carry-in range IR. Therefore, the operator, as watching the image displayed on the display unit 36, controls the crane so that the mold 22 displayed on the display unit 36 falls within the carry-in range IR, whereby it is possible to lead the mold 22 in place between the stationary platen 24 and the moving platen 26 without causing the mold 22 to interfere with any obstacles. Further, the time for loading the mold 22 can be shortened.

Also in variational example 1, the display unit 36 may simultaneously display multiple carry-in ranges IR each having a size corresponding to one of the predetermined different distances from the imaging unit 32. In this manner, even if the obstacles, i.e., the stationary platen 24, the moving platen 26, and the tie bars 30 are not imaged, it is possible to exactly guide the mold 22 through the carry-in route by displaying the carry-in ranges IR corresponding to the multiple distances. As a result, when the operator controls the crane so as to fit the mold 22 within the smallest carry-in range IR among the displayed carry-in ranges IR greater than the mold 22, it is possible to lead the mold 22 into place between the stationary platen 24 and the moving platen 26 without causing any interference with obstacles and shorten the time for loading the mold 22.

Variational Example 2

Figure 9:
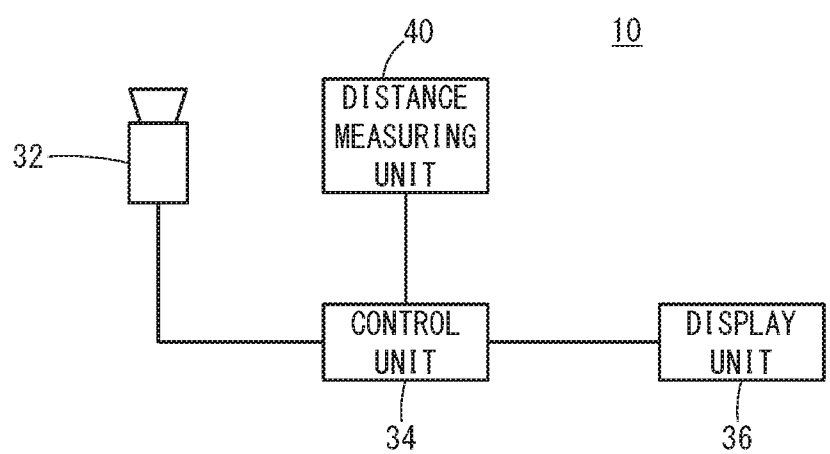
FIG. 9 is a diagram explaining a display system according to variational example 2.

FIG. 9 is a diagram for explaining the configuration of a display system 10 in variational example 2. Here, the same components as those described in the above embodiment will be allotted with the same reference numerals, and only different points will be described.

The display system 10 further includes a distance measuring unit 40 in addition to the imaging unit 32, the control unit 34, and the display unit 36. The distance measuring unit 40 is a distance measuring sensor that measures the distance. The distance measuring unit 40 is arranged at a lower position (negative Z-direction side) than the mold 22 to be carried in and measures a distance Lz to the mold 22. The distance measuring unit 40 may be provided in the imaging unit 32. The distance measuring unit 40 may be arranged between the stationary platen 24 and the moving platen 26. Alternatively, the distance measuring unit 40 may be provided on the upper surface of the stationary platen 24.

The control unit 34 calculates the size of the carry-in range IR corresponding to the distance Lz to the mold 22 measured by the distance measuring unit 40. At this time, the storage medium in the control unit 34 may store information indicating the size of the carry-in range IR (hereinafter referred to as the standard carry-in range IRs) corresponding to the predetermined distance from the distance measuring unit 40 (hereinafter referred to as the standard distance Lzs). Then, the control unit 34 may calculate the carry-in range IR based on the distance Lz measured by the distance measuring unit 40, the standard distance Lzs, and the size of the standard carry-in range IRs.

In brief explanation, the size of the carry-in range IR can be given by the relational expression: the size of the carry-in range IR=(the size of the standard carry-in range IRs)×(the standard distance Lzs)/(the distance Lz). That is, as the measured distance Lz becomes longer compared to the standard distance Lzs, the calculated size of the carry-in range IR becomes smaller relative to the standard carry-in range IRs. The control unit 34 outputs to the display unit 36 information representing the carry-in range IR of the calculated size.

The display unit 36 displays the carry-in range IR based on the information representing the calculated size of the carry-in range IR by the control unit 34. Therefore, the display unit 36 displays the carry-in range IR having a size corresponding to the distance Lz measured by the distance measuring unit 40, so that the displayed carry-in range IR changes in size according to the measured distance Lz.

In this way, by displaying the carry-in range IR of the size corresponding to the position of the mold 22 being carried in (the distance Lz from the distance measuring unit 40 to the mold 22) together with the image of the mold 22, it is possible to exactly guide the mold 22 through the carry-in route. Accordingly, the operator, as watching the image displayed on the display unit 36, controls the crane so that the mold 22 displayed on the display unit 36 falls within the carry-in range IR, whereby it is possible to lead the mold 22 in place between the stationary platen 24 and the moving platen 26 without causing the mold 22 to interfere with any obstacle. Further, the time for loading the mold 22 can be shortened.

Variational Example 3

Figure 10:
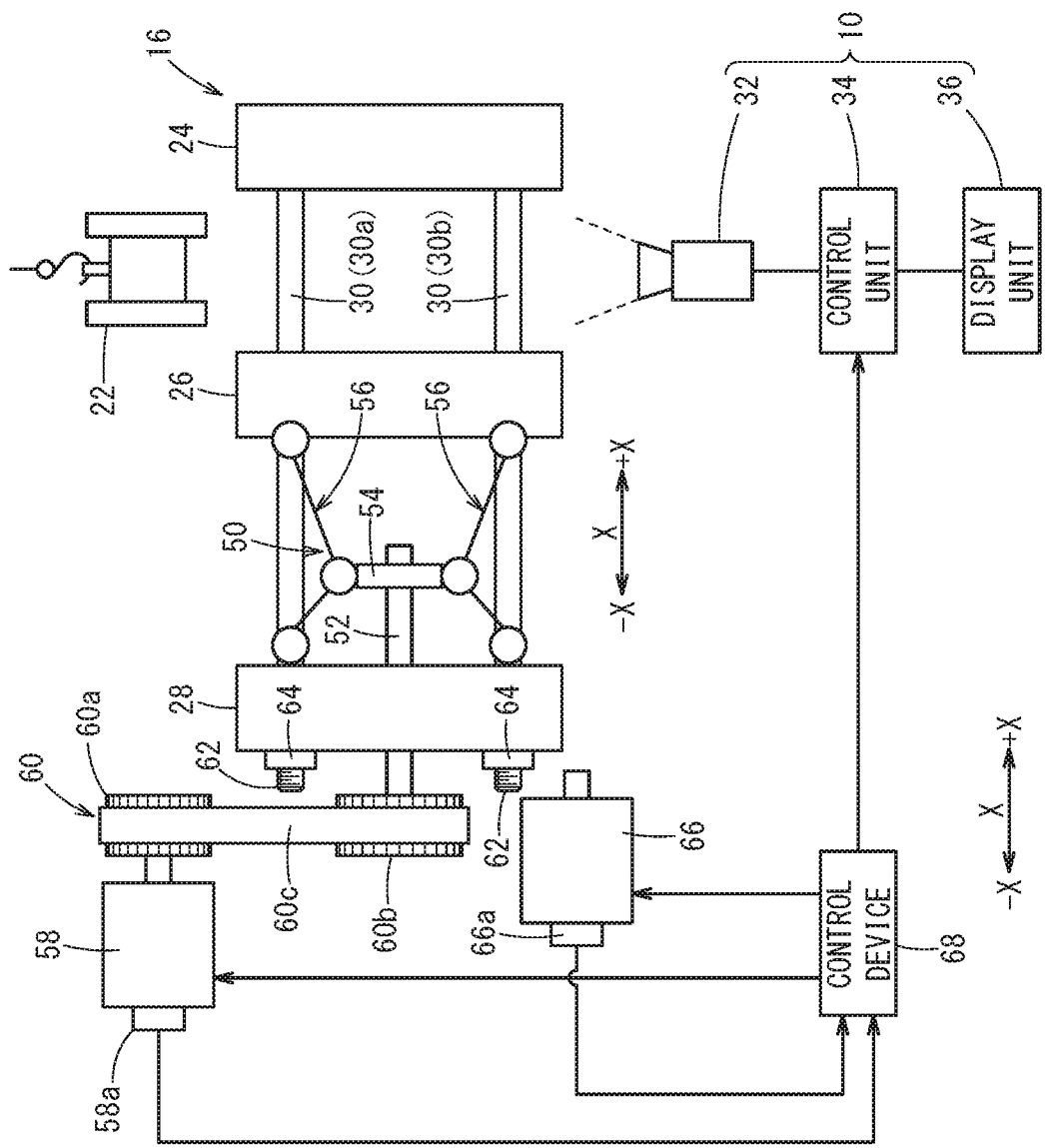
FIG. 10 is a diagram showing a configuration of a display system and a clamping device in an injection molding machine equipped with the display system according to variational example 3.

FIG. 10 is a view showing a configuration of a display system 10 and a clamping device 16 of an injection molding machine 12 provided with the display system 10 according to variational example 3. Here, the same components as those described in the above embodiment will be allotted with the same reference numerals, and only different points will be described.

The clamping device 16 includes a toggle mechanism 50 arranged between the moving platen 26 and the rear platen 28. The toggle mechanism 50 is a mechanism for moving the moving platen 26 in the X-direction with respect to the rear platen 28. The toggle mechanism 50 includes a ball screw 52, a crosshead 54 screwed with the ball screw 52, and a link member 56 that connects the crosshead 54 with the moving platen 26 and the rear platen 28 and is extendable in the X-direction.

The ball screw 52 is kept parallel to the X-direction and attached to the rear platen 28. The ball screw 52 is attached to the rear platen 28 such that the ball screw 52 is rotatable but immovable in the axial direction. The crosshead 54 is screwed with the ball screw 52 on the positive X-direction side with respect to the rear platen 28. As the ball screw 52 rotates, the crosshead 54 moves in the X-direction. When the ball screw 52 rotates in the clockwise direction, the crosshead 54 moves in the positive X-direction, so that the link member 56 extends. As a result, the moving platen 26 moves in the positive X-direction relative to the rear platen 28. Conversely, when the ball screw 52 rotates in the counter-clockwise direction, the crosshead 54 moves in the negative X-direction, so that the link member 56 contracts. As a result, the moving platen 26 moves in the negative X-direction relative to the rear platen 28.

The rotational force of a clamp opening/closing servomotor 58 provided in the clamping device 16 is transmitted to the ball screw 52 via a power transmission device 60. Therefore, when the clamp opening/closing servomotor 58 rotates in the clockwise direction, the rotational force of the clamp opening/closing servomotor 58 is transmitted to the ball screw 52 so that the moving platen 26 (the moving half 22b) moves in the positive X-direction to close the mold 22. When the clamp opening/closing servomotor 58 rotates in the counterclockwise direction, the rotational force of the clamp opening/closing servomotor 58 is transmitted to the ball screw 52 so that the moving platen 26 (moving half 22b) moves in the negative X-direction to open the mold 22.

It should be noted that the power transmission device 60 is made up from a pulley 60a provided on the rotational shaft of the clamp opening/closing servomotor 58, a pulley 60b provided on the ball screw 52 on the negative X-direction side with respect to the rear platen 28, an endless belt 60c wound around the pulleys 60a and 60b, and others.

Further, a threaded portion 62 is formed at the end part of each of the four tie bars 30 on the negative X-direction side, and four tie bar nuts 64 are screwed respectively to the four threaded portions 62. The threaded portion 62 and the tie bar nut 64 are located on the negative X-direction side of the rear platen 28. The tie bar nut 64 is supported by the rear platen 28 so as to be rotatable with respect to the rear platen 28.

A mold thickness adjusting servomotor 66 provided in the clamping device 16 is a motor that adjusts the distance between the stationary platen 24 and the moving platen 26 under the condition in which the crosshead 54 has moved to the foremost position in the positive X-direction (in a state where the link member 56 is fully extended). Therefore, when the crosshead 54 has moved to the foremost position, clamping force acts on the mold 22. The distance between the stationary platen 24 and the moving platen 26 is determined based on the thickness of the mold 22 and the clamping force.

More specifically, the mold thickness adjusting servomotor 66 rotates the four tie bar nuts 64 via an unillustrated power transmission device. As the tie bar nuts 64 rotate, the tie bar nuts 64 move in the X-direction so that the rear platen 28, the toggle mechanism 50, and the moving platen 26 integrally move in the X-direction. When the mold thickness adjusting servomotor 66 rotates in the clockwise direction, the rear platen 28, the toggle mechanism 50, and the moving platen 26 move together in the positive X-direction, whereas as the mold thickness adjusting servomotor 66 rotates in the counterclockwise direction, the rear platen 28, the toggle mechanism 50, and the moving platen 26 integrally move in the negative X-direction.

The clamp opening/closing servomotor 58 and the mold thickness adjusting servomotor 66 are driven under the control of a control device 68 of the injection molding machine 12. An encoder 58a for detecting the rotational position, a rotational rate, and the like is provided in the clamp opening/closing servomotor 58, whereas an encoder 66a for detecting the rotational position, the rotational speed, and the like is provided in the mold thickness adjusting servomotor 66. Based on the detection signals from the encoders 58a, 66a, the clamp opening/closing servomotor 58 and the mold thickness adjusting servomotor 66 are feedback-controlled by the control device 68.

The distance (distance in the X-direction) Lx between the stationary platen 24 and the moving platen 26 is varied by driving the clamp opening/closing servomotor 58 (driver). Driving the mold thickness adjusting servomotor 66 (driver) also varies the distance Lx between the stationary platen 24 and the moving platen 26. Therefore, the size of the mold-transportable area IA (more specifically, the length in the X-direction of the mold-transportable area IA) is changed by the driving of the drivers (the clamp opening/closing servomotor 58 and the mold thickness adjusting servomotor 66).

Thus, the control unit 34 of the display system 10 obtains from the control device 68 information indicating the distance Lx between the stationary platen 24 and the moving platen 26. The information that indicates the distance Lx between the stationary platen 24 and the moving platen 26 may be the detection signals from the encoders 58a and 66a or the rotation amounts of the clamp opening/closing servomotor 58 and the mold thickness adjusting servomotor 66. The information that indicates the distance Lx may be the positional information of the rear platen 28 moved by the mold thickness adjusting servomotor 66 and the positional information of the moving platen 26 moved by the clamp opening/closing servomotor 58. Further, the distance Lx between the stationary platen 24 and the moving platen 26 may be directly acquired by an unillustrated linear sensor.

The control unit 34 calculates the length of the carry-in range IR in the X-direction based on the acquired information indicating the distance Lx between the stationary platen 24 and the moving platen 26. At this time, the storage medium in the control unit 34 may have stored the length of the carry-in range IR in the X-direction (hereinafter referred to as the standard carry-in range IRs) corresponding to the predetermined distance (hereinafter referred to as the standard distance Lxs) between the stationary platen 24 and the moving platen 26. Then, the control unit 34 may calculate the length of the carry-in range IR in the X-direction based on the acquired distance Lx, the standard distance Lxs, and the length of the standard carry-in range IRs in the X-direction.

Briefly, the length the carry-in range IR in the X-direction can be determined by the relational expression: the length of the carry-in range IR in the X-direction=(the length of the standard carry-in range IRs in the X-direction)×(the distance Lx)/(the standard distance Lxs). That is, as the obtained distance Lx becomes longer compared to the standard distance Lxs, the calculated length of the carry-in range IR in the X-direction becomes greater. The control unit 34 outputs information representing the carry-in range IR of the calculated size to the display unit 36. Here, the length of the carry-in range IR in the Y-direction is constant regardless of the acquired distance Lx.

The display unit 36 displays the carry-in range IR based on the information indicating the length of the carry-in range IR in the X-direction calculated by the control unit 34. Therefore, the display unit 36 displays the carry-in range IR having a size corresponding to the distance Lx between the stationary platen 24 and the moving platen 26, so that the displayed carry-in range IR changes in size according to the distance Lx.

In this manner, by displaying the carry-in range IR of the size corresponding to the distance Lx between the stationary platen 24 and the moving platen 26 together with the image showing the mold 22, it is possible to exactly guide the mold 22 through the carry-in route. Accordingly, the operator, as watching the image displayed on the display unit 36, controls the crane so that the mold 22 displayed on the display unit 36 falls within the carry-in range IR, whereby it is possible to lead the mold 22 in place between the stationary platen 24 and the moving platen 26 without causing the mold 22 to interfere with any obstacle. Further, the time for loading the mold 22 can be shortened.

Variational Example 4

The imaging unit 32 and the control unit 34 may be connected by wires or wirelessly. For example, the control unit 34 and the display unit 36 may be configured by a mobile terminal such as a PC tablet or a smartphone, so that the mobile terminal may acquire an image from the imaging unit 32 wirelessly. Thereby, the crane's operator can keep a mobile terminal near the crane's operator and readily watch the image taken by the imaging unit 32 on the mobile terminal.

Further, the control unit 34 and the display unit 36 may be connected by wires or wirelessly. By connecting the control unit 34 and the display unit 36 wirelessly, it is possible to provide the display unit 36 around the crane's operator so that the operator can readily acquire the image taken by the imaging unit 32 on the mobile terminal.

Moreover, the control unit 34 may be a part of the control device 68 of the injection molding machine. The display unit 36 may be a display device of an unillustrated injection molding machine connected to the control device 68. Thus, an inexpensive system can be realized.

Variational Example 5

The above variational examples 1 to 4 may be freely combined.
[Technical Ideas Obtained from the Embodiments]
Technical ideas that can be grasped from the above embodiment and variational examples 1 to 5 will be described hereinbelow.

A display system (10) display the state of a mold (22) being transported from above into a space between a stationary platen (24) and a moving platen (26) that moves in a predetermined direction relative to the stationary platen (24) in a clamping device (16). The display system (10) includes: an imaging unit (32) configured to image the mold (22) from below; and a display unit (36) configured to display an image taken by the imaging unit (32) together with a carry-in range (IR) of the mold (22) in order to transport the mold (22) in place between the stationary platen (24) and the moving platen (26).

This configuration makes it possible to help the crane's operator guide the mold (22) along the carry-in route. Therefore, the operator can bring the mold (22) in place between the stationary platen (24) and the moving platen (26) without causing the mold (22) to interfere with obstacles, and shorten the time for loading the mold (22).

The display unit (36) may be configured to display the carry-in range (IR) having a size corresponding to a predetermined distance from the imaging unit (32). Thereby, the operator can bring the mold (22) in place between the stationary platen (24) and the moving platen (26) without causing the mold (22) to interfere with obstacles, and shorten the time for loading the mold (22).

The display unit (36) may be configured to display a plurality of carry-in ranges (IR) each having a size corresponding to one of multiple predetermined different distances from the imaging unit (32). This configuration can help the crane's operator exactly guide the mold (22) through the carry-in route of the mold (22). Therefore, the operator can bring the mold (22) in place between the stationary platen (24) and the moving platen (26) without causing the mold (22) to interfere with obstacles, and shorten the time for loading the mold (22).

The display system (10) may further include a distance measuring unit (40) provided below the mold (22) and configured to measure the distance to the mold (22). The display unit (36) may be configured to display the carry-in range (IR) having a size corresponding to the distance measured by the distance measuring unit (40). This configuration can help the crane's operator exactly transport the mold (22) through the carry-in route of the mold (22). Therefore, the operator can bring the mold (22) in place between the stationary platen (24) and the moving platen (26) without causing the mold (22) to interfere with obstacles, and shorten the time for loading the mold (22).

The distance measuring unit (40) may be provided in the imaging unit (32), on the upper surface of the stationary platen (24), or between the stationary platen (24) and the moving platen (26). Thereby, the distance measuring unit (40) can measure the distance to the mold (22).

The imaging unit (32) may be provided on the upper surface of the stationary platen (24). Even with this configuration, it is possible to show the carry-in route of the mold (22) to the crane's operator. Therefore, the operator can put the mold (22) in place between the stationary platen (24) and the moving platen (26) without causing the mold (22) to interfere with obstacles, and shorten the time for loading the mold (22).

The imaging unit (32) may be provided between and below the stationary platen (24) and the moving platen (26). The imaging unit (32) may be configured to image the mold (22) together with possible obstacles that may interfere with the mold (22), the possible obstacles including the stationary platen (24), the moving platen (26), and tie bars (30) for guiding the moving platen (26) to move relative to the stationary platen (24). This configuration enables the operator to recognize the relative positional relationship between the mold (22) and the obstacles by viewing the image. Therefore, the operator can bring the mold (22) in place between the stationary platen (24) and the moving platen (26) without causing the mold (22) to interfere with obstacles, and shorten the time for loading the mold (22).

The display system (10) may further include a driving unit (58, 66) configured to move the moving platen (26) relative to the stationary platen (24) so as to vary the distance between the moving platen (26) and the stationary platen (24). The display unit (36) may be configured to change the size of the carry-in range (IR) to be displayed according to the distance between the moving platen (26) and the stationary platen (24). Thereby, even when the distance between the moving platen (26) and the stationary platen (24) is changed, the operator can bring the mold (22) in place between the stationary platen (24) and the moving platen (26) without causing the mold (22) to interfere with obstacles, and shorten the time for loading the mold (22).

The present invention is not limited in particular to the embodiments described above, and further various modifications are possible without departing from the essence and gist of the present invention.

What is claimed is:

1. A display system for displaying a state of a mold being transported from above into a space between a stationary platen and a moving platen that moves in a predetermined direction relative to the stationary platen in a clamping device, comprising:
   an imaging unit provided between and below the stationary platen and the moving platen and configured to image the mold from below, together with obstacles that may interfere with the mold, the obstacles including the stationary platen, the moving platen, and tie bars that guide the moving platen to move relative to the stationary platen; and
a display unit configured to display an image taken by the imaging unit together with a carry-in range of the mold in order to transport the mold in place between the stationary platen and the moving platen.

2. The display system according to claim 1, wherein the display unit is configured to display the carry-in range having a size corresponding to a distance from the imaging unit to a predetermined position located along the transporting direction.

3. The display system according to claim 2, wherein the display unit is configured to display a plurality of carry-in ranges simultaneously each having a size corresponding to one of distances from the imaging unit to a plurality of predetermined different positions located along the transporting direction.

4. The display system according to claim 1, further comprising a distance measuring unit comprising a distance measuring sensor provided below the mold and configured to measure the distance to the mold, wherein the display unit is configured to display the carry-in range having a size corresponding to the distance that is from the distance measuring unit to the mold and measured by the distance measuring unit.

5. The display system according to claim 4, wherein the distance measuring unit is provided in the imaging unit, on an upper surface of the stationary platen, or between the stationary platen and the moving platen.

6. The display system according to claim 1, wherein the imaging unit is provided on an upper surface of the stationary platen.

7. The display system according to claim 1, wherein imaging unit is provided between and below the stationary platen and the moving platen and configured to image the mold together with obstacles that may interfere with the mold, the obstacles including the stationary platen, the moving platen, and tie bars that guide the moving platen to move relative to the stationary platen.

8. The display system according to claim 1, further comprising a driving unit comprising a driver configured to move the moving platen relative to the stationary platen so as to vary a distance between the moving platen and the stationary platen, wherein the display unit is configured to change a size of the carry-in range to be displayed according to the distance between the moving platen and the stationary platen.

9. A display method of displaying a state of a mold being transported from above in a space between a stationary platen and a moving platen that moves in a predetermined direction relative to the stationary platen in a clamping device, comprising:
an imaging step of imaging the mold from below by an imaging unit, wherein the imaging step is performed such as to image the mold together with obstacles that may interfere with the mold, the obstacles including the stationary platen, the moving platen, and tie bars that guide the moving platen to move relative to the stationary plate; and
a displaying step of displaying on a display unit the taken image together with a carry-in range of the mold in order to transport the mold in place between the stationary platen and the moving platen.

10. The display method according to claim 9, wherein the displaying step is performed such as to display the carry-in range having a size corresponding to a distance from the imaging unit to a predetermined position located along the transporting direction.

11. The display method according to claim 10, wherein the display step is performed such as to display a plurality of carry-in ranges simultaneously each having a size corresponding to one of distances from the imaging unit to a plurality of predetermined different positions located along the transporting direction.

12. The display method according to claim 9, further including a distance measuring step of measuring the distance to the mold by means of a distance measuring unit, wherein the displaying step displays the carry-in range having a size corresponding to the distance that is from the distance measuring unit to the mold and measured by the distance measuring unit.

13. The display method according to claim 9, wherein the imaging step is performed such as to image the mold together with obstacles that may interfere with the mold, the obstacles including the stationary platen, the moving platen, and tie bars that guide the moving platen to move relative to the stationary platen.

14. The display method according to claim 9, further comprising a driving step of moving the moving platen relative to the stationary platen by means of a driving unit to vary a distance between the moving platen and the stationary platen, wherein the displaying step changes a size of the carry-in range to be displayed according to the distance between the moving platen and the stationary platen.

* * * * *